Figure 1:
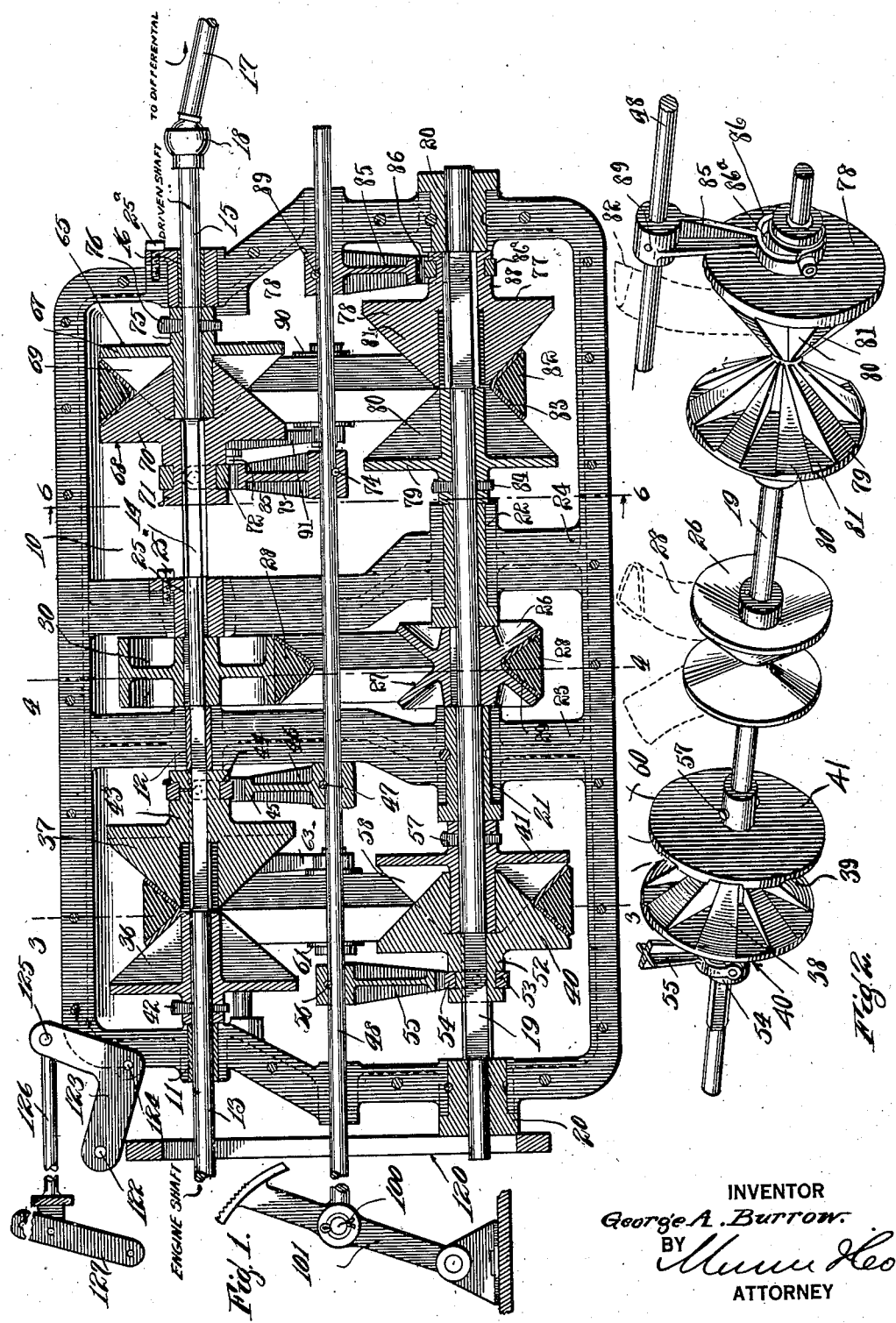

March 27, 1928.  1,664,349

G. A. BURROW

TRANSMISSION FOR SHAFTS

Filed March 1, 1927   3 Sheets-Sheet 1

INVENTOR
George A. Burrow
BY
ATTORNEY

March 27, 1928.

G. A. BURROW 1,664,349

TRANSMISSION FOR SHAFTS

Filed March 1, 1927

3 Sheets-Sheet 2

INVENTOR
George A. Burrow.
BY
ATTORNEY

March 27, 1928.
G. A. BURROW
1,664,349
TRANSMISSION FOR SHAFTS
Filed March 1, 1927
3 Sheets-Sheet 3
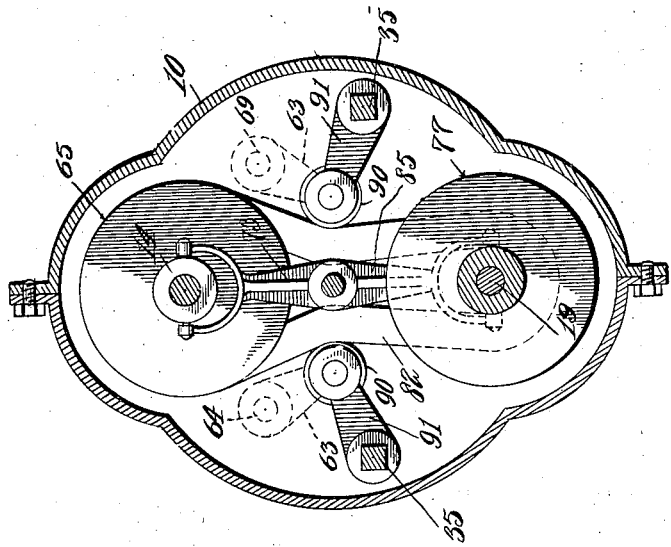
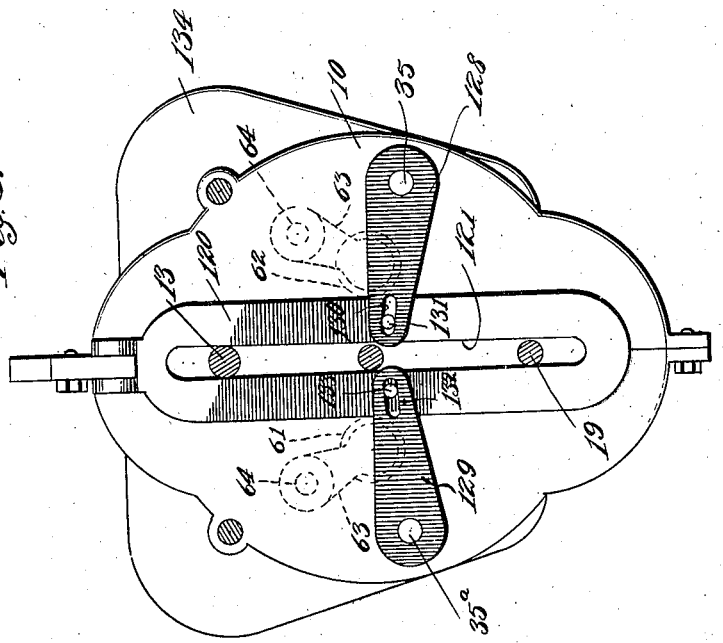
WITNESSES
INVENTOR
George A. Burrow.
BY
ATTORNEY Patented Mar. 27, 1928.

1,664,349

UNITED STATES PATENT OFFICE.

GEORGE A. BURROW, OF SPOKANE, WASHINGTON, ASSIGNOR, BY DIRECT AND MESNE ASSIGNMENTS, TO J. SUTHERLAND AND C. H. CONRAD, TRUSTEES, BOTH OF SPOKANE, WASHINGTON.

TRANSMISSION FOR SHAFTS.

Application filed March 1, 1927. Serial No. 171,875.

This invention relates to a transmission for shafts and has for its object the provision of a device which will eliminate all gears in the ordinary transmission.

A further object of the invention is the provision of a transmission which is noiseless and which will not require any oil for lubrication except the oil required for lubricating the shaft bearings.

A still further object of the invention is the provision of a transmission in which no gears are employed and in which the simplicity and construction requires a minimum number of operations for causing the various degrees of transmission to be placed in operation.

A still further object of the invention is to secure a greater maximum of power and speed at a less expenditure of fuel over all known general types of transmission.

This invention will be best understood from a consideration of the following detailed description, in view of the accompanying drawings forming a part of the specification; nevertheless, it is to be understood that the invention is not confined to the disclosure, being susceptible of such changes and modifications which shall define no material departure from the salient features of the invention as expressed in the appended claims.

Figure 2:
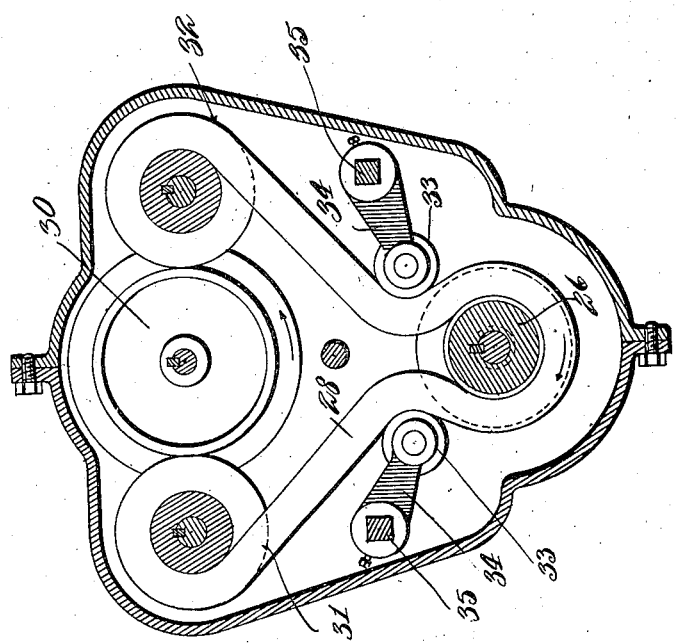
Figure 3:
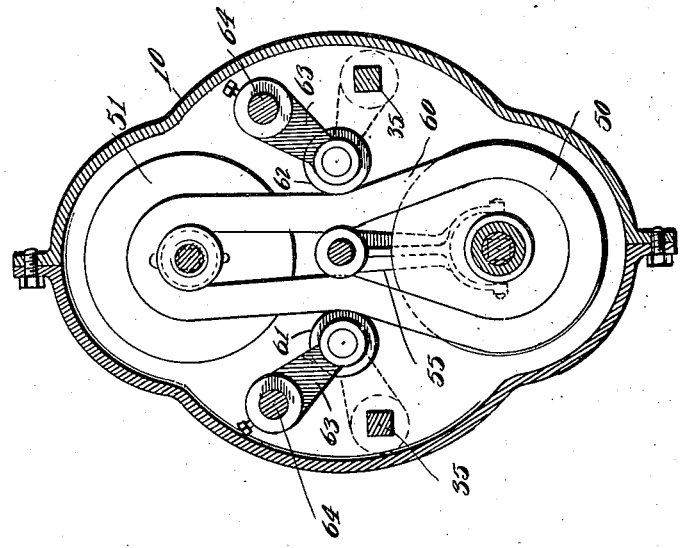

In the drawings:

Figure 1 is a vertical longitudinal section of the transmission constructed in accordance with the principles of my invention, Figure 2 is a view in perspective of the differential pulleys employed in the construction, Figure 3 is a vertical section taken along the line 3—3 of Figure 1, Figure 4 is a vertical section taken along the line 4—4 of Figure 1, Figure 5 is a front view in elevation of the transmission, and Figure 6 is a vertical transverse section.

Referring more particularly to the drawings 10 designates a section of a transmission housing which has bearings 11 and 12 in which is rotatably mounted one end of an engine shaft 13. A driven shaft 14 has its inner end mounted for rotation in an eccentric bearing 25 while its outer end 15 is mounted in an eccentric 16. A shaft 17 having a universal connection 18 with the driven shaft 14 extends to the differential (not shown).

A transmission drive shaft 19 is mounted in the movable bearings 20 carried by the housing 10, and this shaft extends from end to end of the housing. Intermediate bearings 21 and 22 are respectively carried by a web or spider 23 and 24 cast integrally with the housing 10 or the same may be formed separately and secured to said housing. The bearing 12 is also carried by the web 23 while the bearing 25, supporting one end of the shaft 14, is carried by the web 24. The eccentric bearings are adjusted by the set screws 25ª.

Rigid with the shaft 19 and located between the bearings 21 and 22 is a pulley 26 having a V-shaped groove 27 adapted to receive a belt 28 which is V-shaped in cross section and has its inner face, as shown at 29, surfaced with hard rubber.

Referring more particularly to Figure 4 it will be seen that the belt is trained around the lower edge of a pulley 30 while being trained over pulleys 31 and 32 at opposite sides of the pulley 30. Belt tighteners are employed which are in the form of rollers 33. Each roller is carried by an arm 34 which is secured to an operating shaft 35 which when revolved causes the rollers to be moved into engagement with the belt for tightening the same or out of engagement so that the belt may slip on the pulleys when the shafts 19 and 14 are revolved in a manner to be presently described.

At the forward end of the casing 10 and on the shaft 13 is keyed a conically-shaped section 36 of a pulley while a co-operating conically-shaped section 37 is slidably mounted on said shaft. As shown in Fig. 2 a section 40 is provided with portions or triangularly-shaped members 38 adapted to be received within similarly formed openings 39 in a section 41 so that when the sections are moved into each other the effective diameter of the pulley will be increased as is illustrated by said sections which are slidably mounted on the shaft 19, the last mentioned sections being in the same vertical plane with the sections 36 and 37. The section 36 is pinned at 42 to the shaft 13 while the section 37 has a hub 43 in which is provided an annular groove 44 adapted to receive a yoke 45 on the end of an arm 46. This arm is pinned at 47 to a reciprocating shaft 48. The pulley or lower gear formed of the sections 40 and 41 is generally designated by the numeral 50 in Fig. 3 and is aligned with the upper gear 51 composed of the sections 36 and 37 is adapted to be driven by the shaft 19, section 40 having a hub 52 provided with an annular groove 53 which is adapted to receive a yoke 54 carried by an arm 55 pinned at 56 to the rod 48. The section 41 is pinned at 57 to the shaft 19. The section 41 of the gear 50 is likewise provided with slots, as shown at 58, adapted to receive similarly formed members or fingers 59 in the section 40. A belt 60 which is triangular in cross section is adapted to be received between the V-shaped grooves of the gears 50 and 51 and is adapted to drive the gear 50 through rotation of the gear 51 and shaft 13. Belt tighteners in the form of pulleys 61 and 62 are adapted to be applied to opposite sides of the belt 60 to maintain the same taut on the rollers. Each roller is carried by an arm 63 rigid with a shaft 64. The sections 36 and 37 are formed similarly to the sections 40 and 41 and have the triangularly shaped members 38 and recesses 39.

A pulley, generally designated by the numeral 65 in Fig. 6 is also formed of two sliding sections 67 and 68 adapted to be interfitted into each other for increasing the diameter of the pulley with each pulley being provided with similarly constructed openings 69 and fins or fingers 70 adapted to be received within each other. The section 68 has a hub 71 provided with an annular groove adapted to receive a yoke 72 carried by an arm 73 pinned at 74 to the reciprocating rod 48. The section 67 has a hub portion 75 pinned at 76 to the shaft 14.

A pulley, generally designated by the numeral 77, in Figure 6, is formed of two sections 78 and 79 which have complementarily formed grooves 80 and fingers 81 adapted to be received within each other when the section 81 is moved into the section 80 for increasing the effective diameter of the pulley 77. A belt 82 is trained around the pulleys 65 and 77 and is substantially triangularly-shaped in cross section. This belt has its inner face provided with a hard surface, as shown at 83, in order to prevent wear on the same. The section 79 is pinned at 84 to the shaft 19 while the section 78 is slidably mounted on the shaft and moved by means of an arm 85 carrying a yoke 86 provided with a ring 86ª which is received within an annular groove on a hub 88 of the section 78. The arm 85 is pinned at 89 to the reciprocating rod 48. On opposite sides of the belt 82 are provided belt tighteners in the form of rollers 90. Each roller is carried by an arm 91, the arm being rigid with the shaft 35.

The rollers 90 are adapted to be moved out of engagement with the belt 82 when the rollers 33 are moved into engagement with the belt 28 and vice versa. The object of such construction permits the belt 28 to drive the shaft 14 from shaft 19 while the gear 65 is idle and while the belt 82 is not maintained in a taut position. When the belt 82 is taut the belt 28 is loose.

The rod 48 has one end pivotally connected at 100 to a lever or foot pedal 101 so that as this rod is moved in either direction the various shifters for the sections of the gears are likewise moved. A separate lever or pedal is employed for rocking the shaft 35 for actuating the belt tighteners for the belts 28 and 82 simultaneously but in opposite directions as will be presently described.

A bar 120 is slidably mounted at the forward end of the casing 10 and is provided with a slot 121 adapted to receive the projecting end of the shaft 19 and the projecting end of the shaft 13. These shafts act as a guide for the reciprocating bar 120. The upper end of the bar is pivotally connected at 122 to one arm of a bell crank lever 123 pivotally mounted at 124 on the forward end of the casing 10. The other end of the arm is pivotally connected at 125 to a link 126. The forward end of the link is connected to a lever 127 pivotally mounted on any fixed part of the frame of the automobile on which the transmission is mounted. This lever is connected in any approved manner with the reverse operating pedal or shifter rod of the automobile.

A lever 128 is rigid with the shaft 35 mounted in bearings to one side of the casing 10 while a lever 129 is rigid with a shaft 35ª at the opposite side of the casing. The forward end of the lever 128 is provided with a slot 130 adapted to receive a pin 131 carried by the bar 120. The lever 129 is provided with a slot 132 adapted to receive a pin 133 also carried by the reciprocating bar 120.

The intermediate portion of the casing 10 which embraces the gears 27 and 30 is enlarged, as shown at 134, in order to provide sufficient space for housing the idling rollers 31 and 32.

The operation of my device is as follows: When the gears 50 and 51, as indicated in Fig. 3, are in the position shown in Fig. 1 and the gears 65 and 77 are in the position shown in Fig. 1, the shaft 13 which is directly connected with the engine shaft, causes a direct drive of shaft 19 and likewise shaft 14 so that a speed which is less than high speed is maintained at this time through the shaft 17 actuating the differential of the automobile. Therefore, lever 101 is in the position shown in full lines in Fig. 1.

When said lever is moved forwardly or to the left in Fig. 1 the rod 48 is moved forwardly, causing the section 40 to be moved outwardly from said section 41 so that the last-mentioned sections are in the same expanded relation as sections 36 and 37. The section 70 is then moved outwardly from section 67 of the gear 65 while section 78 is moved inwardly toward section 79. In this position of the various sections of the gears, gear 51 having the same effective diameter as gear 50 will drive the shaft 19 at the same speed as shaft 13, while the gear including sections 78 and 79 being of greater diameter than the expanding gears 67 and 68 will tend to drive gear 65 at a more rapid rate than shaft 19 and thereby cause a high speed of revolution of the driven shaft 17. When the shaft 19 drives shaft 14 through the gears 65 and 67 the arms 91 on the shafts 35 have been moved downwardly so that as said arms are about the dead center or in a substantially horizontal position they will have maintained the belt 82 under its greatest tension, thereby causing the belt to drive gears 65 through gears 77. Since the arms 34 are likewise rigid with the shafts 35, as shown in Fig. 4, these arms will be moved downwardly and permit the gears 31, 32, 30 and 26 to idle since the belt 28 is not maintained in taut relation. However, when the arms 34 are moved upwardly the belt 28 will have tightened, thereby causing rotation of the gear 30 through the gear 26 and the belt 28. When the arms 34 are in their upper operative relation with respect to tightening the belt 28 the arms 91 of Fig. 6 are likewise in an upper position or at an acute angle to the horizontal, passing through shaft 35 so that the belt tighteners 90 merely contact with the belt 82 and thus permit gears 65 and 77 to idle so that the shaft 14 is reversely driven through the shaft 19 and through the gears 26 and 30 and the belt 28. The shafts 35 it will be noted are actuated by means of the reciprocating bar 120 and through the arms 128 and 129. As shown in Figs. 1 and 5 the arms 128 and 129 are inclined at an angle to the horizontal and slightly above the plane passing through the shafts 35 so that the arms 91 have moved the belt tighteners 90 out of operative relation with the belt 82 while the belt tighteners 33 of the arms 34 have been moved in operative relation with the belt 28 and the shaft 14 is reversely driven. Since the position of the bar 120 in Fig. 1 and the bell crank lever 123 indicates the reverse position of the transmission, the upper end of the lever 127 has been moved rearwardly as indicated by the arrow in Fig. 1. When the reverse lever (not shown) is released and the usual spring returns the lever to its normal inoperative position and causes a reverse movement of the lever 127 to that which is shown in Fig. 1, the bell crank will then be oscillated, lowering the bar 120 and causing the arms 91 to be lowered, moving the belt tighteners 90 into operative engagement with the belt 82 thereby causing gears 65 to be driven through gears 77 while arms 34 of the reverse belt tightener as shown in Fig. 4 are moved downwardly and out of operative relation with the belt 28.

I claim:

1. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft, means for alternately tightening the belts associated with the pulleys on the counter and driven shafts, a plurality of pulleys associated with one of the last mentioned belts, said last mentioned belt being entrained over the pulleys and causing the reverse rotation of the driven shaft relative to the countershaft when said belt is tightened and the other belt associated with the pulleys on the driven shaft and countershaft is relaxed.

2. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft means for alternately tightening the belts associated with the pulleys on the countershaft and driven shaft, one of the last mentioned belts when tightened causing the driven shaft to be rotated in a direction which is reverse to the direction of rotation of the engine shaft, certain of the pulleys being formed of two sections movable towards or away from each other for increasing or decreasing the diameters of the pulleys.

3. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft, means for alternately tightening the belts associated with the pulleys on the countershaft and driven shaft, one of the last mentioned belts when tightened causing the driven shaft to be rotated in a direction which is reverse to the direction of rotation of the engine shaft, certain of the pulleys being formed of two sections movable towards or away from each other for increasing or decreasing the diameters of the pulleys, and means for moving the section of the pulley on the countershaft into its cooperating section while moving the section of the pulley on the engine shaft away from its associated section.

4. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft, means for alternately tightening the belts associated with the pulleys on the counter and driven shafts, one of the last mentioned belts when tightened causing the driven shaft to be rotated in a direction which is reverse to the direction of rotation of the engine shaft, certain of the pulleys being formed of a pair of sections movable towards or away from each other for increasing or decreasing the diameter of the pulley, and means for moving a section of a pulley on the countershaft towards its associated section while simultaneously moving the section on the engine shaft away from its associated section.

5. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft, means for alternately tightening the belts associated with the pulleys on the counter and driven shafts, one of the last mentioned belts when tightened causing the driven shaft to be rotated in a direction which is reverse to the direction of rotation of the engine shaft, certain of the pulleys being formed of a pair of sections movable towards or away from each other for increasing or decreasing the diameter of the pulley, means for moving a section of a pulley on the countershaft towards its associated section while simultaneously moving the section on the engine shaft away from its associated section, said movable means including means for causing the section of the pulley on the countershaft to be moved away from its associated section for causing a section of the pulley on the driven shaft to be moved towards its associated section.

6. A device of the character described comprising an engine shaft, a countershaft, a driven shaft adapted to be connected with the differential of an automobile, pulleys mounted on the shafts, a belt connecting a pair of the pulleys on the engine shaft and countershaft, belts connecting pairs of the pulleys on the countershaft and driven shaft, means for tightening the belts associated with the pulleys on the counter and driven shafts, certain of the pulleys being formed of a pair of sections movable towards or away from each other for increasing or decreasing the diameter of the pulley, means for moving a section of a pulley on the countershaft towards its associated section while simultaneously moving the section on the engine shaft away from its associated section, one of the belts associated with a pair of the pulleys connected relative to the countershaft and driven shaft being so arranged that it will cause reverse rotation of the driven shaft relative to the countershaft.

7. A device of the character described comprising an engine shaft, a countershaft and a driven shaft, a pulley each on the engine shaft and countershaft, a belt trained over the pulleys whereby the engine shaft will drive the countershaft, a pulley each on the driven shaft and countershaft, pulleys associated with the last-mentioned pulleys, a belt trained over the pulleys on the countershaft, the driven shaft and last-mentioned pulleys, whereby the countershaft will cause reverse rotation of the driven shaft, belt tighteners engaging the last-mentioned belt for causing said belt to drive the pulleys, a pulley on the driven shaft, a second pulley each on the countershaft and the driven shaft, a tightener trained over the last-mentioned pulleys, a belt tightener engaging the last-mentioned belt for causing rotation of the pulley on the driven shaft whereby the driven shaft will be directly rotated from the countershaft, and means for simultaneously actuating the belt tightener whereby one tightener will be moved into engagement with one of the last-mentioned belts while the other belt tightener will be moved out of engagement with the other belt of the last-mentioned belt.

8. A device of the character described comprising an engine shaft, a countershaft and a driven shaft, a pulley each on the engine shaft and countershaft, a belt trained over the pulleys whereby the engine shaft will drive the countershaft, a pulley each on the driven shaft and countershaft, pulleys associated with the last-mentioned pulleys, a belt trained over the pulleys on the countershaft, the driven shaft and last-mentioned pulleys whereby the countershaft will cause reverse rotation of the driven shaft, belt tighteners engaging the last-mentioned belt for causing said belt to drive the pulleys, a pulley on the driven shaft, a second pulley each on the countershaft and the driven shaft, a belt trained over the last-mentioned pulleys, a belt tightener engaging the last-mentioned belt for causing rotation of the pulley on the driven shaft whereby the driven shaft will be directly rotated from the countershaft, means for simultaneously actuating the belt tightener whereby one tightener will be moved into engagement with one of the last-mentioned belts while the other belt tightener will be moved out of engagement with the other belt of the last-mentioned belt, and means included in the last-mentioned pulleys for causing an increased diameter of one of the pulleys and causing a decrease in the diameter of the other pulley for varying the speeds of rotation of the driven shaft relative to the countershaft.

GEORGE A. BURROW.